(12) United States Patent
Guo et al.

(10) Patent No.: US 10,255,323 B1
(45) Date of Patent: Apr. 9, 2019

(54) QUANTIZATION-BASED FAST INNER PRODUCT SEARCH

(71) Applicant: GOOGLE INC., Mountain View, CA (US)

(72) Inventors: Ruiqi Guo, Jersey City, NJ (US); Sanjiv Kumar, Jericho, NY (US); Krzysztof Marcin Choromanski, New York, NY (US); David Morris Simcha, Jersey City, NJ (US)

(73) Assignee: GOOGLE LLC, Mountain View, CA (US)

(*) Notice: Subject to any disclaimer, the term of this patent is extended or adjusted under 35 U.S.C. 154(b) by 537 days.

(21) Appl. No.: 14/878,357

(22) Filed: Oct. 8, 2015

Related U.S. Application Data (60) Provisional application No. 62/212,502, filed on Aug. 31, 2015.

(51) Int. Cl.
*G06F 17/30* (2006.01)

(52) U.S. Cl.
CPC .... *G06F 17/30457* (2013.01); *G06F 17/3053* (2013.01); *G06F 17/30501* (2013.01); *G06F 17/30598* (2013.01)

(58) Field of Classification Search
CPC ......... G06F 17/30457; G06F 17/30501; G06F 17/3053; G06F 17/30598; G06F 17/3071;
(Continued)

(56) References Cited

U.S. PATENT DOCUMENTS

| 5,194,950 A | 3/1993 | Murakami et al. |
| 5,677,986 A | 10/1997 | Amada et al. |

(Continued)

OTHER PUBLICATIONS

Elsayed et al., Article: "Pairwise Document Similarity in Large Collections with MapReduce", Proceedings of ACL-08: HLT, Short Papers (Companion Volume), pp. 265-268, Columbus, Ohio, USA, Jun. 2008. Association for Computational Linguistics. (Year: 2008).*

(Continued)

*Primary Examiner* — Evan Aspinwall
(74) *Attorney, Agent, or Firm* — Brake Hughes Bellermann LLP (57) ABSTRACT

Implementations provide an improved system for efficiently calculating inner products between a query item and a database of items. An example method includes generating a plurality of subspaces from search items in a database, the search items being represented as vectors of elements, a subspace being a block of elements from each search item that occur at the same vector position, generating a codebook for each subspace within soft constraints that are based on example queries, assigning each subspace of each search item an entry in the codebook for the subspace, the assignments for all subspaces of a search item representing a quantized search item, and storing the codebooks and the quantized search items. Generating a codebook for a particular subspace can include clustering the search item subspaces that correspond to the particular subspace, finding a cluster center for each cluster, and storing the cluster center as the codebook entry.

20 Claims, 7 Drawing Sheets

(58) Field of Classification Search
CPC ......... G06F 17/30321; G06F 17/30424; G06F 17/30657; G06F 17/30705; G06F 17/3069; G06K 9/6218; G06K 9/6215
USPC .......................................................... 707/713
See application file for complete search history.

(56) References Cited

U.S. PATENT DOCUMENTS

| | | | |
|---|---|---|---|
| 6,081,274 | A | 6/2000 | Shiraishi |
| 6,404,925 | B1 | 6/2002 | Foote et al. |
| 7,007,019 | B2 | 2/2006 | Kanno |
| 7,152,065 | B2 | 12/2006 | Behrens et al. |
| 8,077,994 | B2 | 12/2011 | Zhang et al. |
| 2004/0220944 | A1* | 11/2004 | Behrens .............. G06F 17/3071 |
| 2007/0263746 | A1 | 11/2007 | Son |
| 2009/0304296 | A1* | 12/2009 | Zhang .................. G06K 9/6217 382/243 |
| 2011/0080965 | A1 | 4/2011 | Liu et al. |
| 2014/0016698 | A1 | 1/2014 | Joshi et al. |
| 2014/0258295 | A1* | 9/2014 | Wang ................ G06F 17/30256 707/737 |
| 2016/0148120 | A1* | 5/2016 | Takahashi ............ G06N 99/005 706/12 |
| 2016/0259816 | A1 | 9/2016 | Song |
| 2017/0026665 | A1 | 1/2017 | Duan et al. |

OTHER PUBLICATIONS

Spyromitros-Xioufis, et al., "A Comprehensive Study Over VLAD and Product Quantization in Large-Scale Image Retrieval", IEEE Transactions on Multimedia, IEEE Service Center, vol. 16, No. 6, Oct. 2014, pp. 1713-1728.

Shicong, et al., "Learning Better Encoding for Approximate Nearest Neighbor Search with Dictionary Annealing", retrieved from https://ai2-s2-pdfs.s3.amazonaws.com/9e8b/2623b432250733479265fdeaa819b7a55b35.pdf, Jul. 6, 2015, 10 pages.

Gersho, et al., "Chapter 12—Constrained Vector Quantization", Vector Quantization and Signal Compression, The Springer International Series in Engineering and Computer Science (Communications and Information Theory), vol. 159, Springer, Boston, MA, 1992, pp. 407-485.

Andoni et al., "Near-Optimal Hashing Algorithms for Approximate Nearest Neighbor in High Dimensions", Communications of the ACM, vol. 51, No. 1, Jan. 2008, pp. 117-122.

Bachrach et al., "Speeding Up the Xbox Recommender System using a Euclidean Transformation for Inner-Product Spaces", In Proceedings of the 8th ACM Conference on Recommender systems, 2014, pp. 257-264.

Bennett et al., "The Netflix Prize", In KDD Cup and Workshop in conjunction with KDD, 2007, 4 pages.

Bottou et al., "Convergence Properties of the K-Means Algorithms.", In Advances in Neural Information Processing Systems 7, 1994, pp. 585-592.

Cohen et al., "Approximating Matrix Multiplication for Pattern Recognition Tasks", Journal of Algorithms, vol. 30, Issue 2, 1999, pp. 211-252.

Cremonesi et al., "Performance of Recommender Algorithms on Top-N Recommendation Tasks", Proceedings of the Fourth ACM Conference on Recommender Systems, Sep. 2010, pp. 39-46.

Davidson et al., "The YouTube Video Recommendation System", Proceedings of the Fourth ACM Conference on Recommender Systems, Sep. 2010, pp. 293-296.

Dean et al., "Fast, Accurate Detection of 100,000 Object Classes on a Single Machine", Proceedings of IEEE Conference on Computer Vision and Pattern Recognition, 2013, 8 pages.

Jegou et al., "Product Quantization for Nearest Neighbor Search", IEEE Transactions on Pattern Analysis and Machine Intelligence, vol. 33, Issue 1, Jan. 2011, 14 pages.

Koenigstein et al., "Efficient Retrieval of Recommendations in a Matrix Factorization Framework", Proceedings of the 21st ACM International Conference on Information and Knowledge Management, 2012, pp. 535-544.

Neyshabur et al., "A simpler and better LSH for Maximum Inner Product Search (MIPS)", arXiv:1410.5518, Oct. 21, 2014, 9 pages.

Ram et al., "Maximum Inner-Product Search using Cone Trees", In SIGKDD International Conference on Knowledge Discovery and Data Mining, Aug. 2012, 9 pages.

Sabin et al., "Product Code Vector Quantizers for Waveform and Voice Coding", IEEE Transactions on Acoustics, Speech, and Signal Processing, vol. 32, No. 3, Jun. 1984, pp. 474-488.

Shrivastava et al., "Improved Asymmetric Locality Sensitive Hashing (ALSH) for Maximum Inner Product Search (MIPS)", arXiv:1410.5410, Nov. 13, 2014, 10 pages.

Shrivastava et al., "Asymmetric LSH (ALSH) for Sublinear Time Maximum Inner Product Search (MIPS)", In Advances in Neural Information Processing Systems, 2014, 9 pages.

Szegedy et al., "Going Deeper with Convolutions", arXiv:1409.4842, Sep. 2014, pp. 1-9.

Kim et al., "Distance approximation techniques to reduce dimensionality for multimedia databases," Knowledge and Information Systems, vol. 28, Issue 1, Jul. 9, 2010, pp. 227-248.

Auvolat, et al., "Clustering is Efficient for Approximate Maximum Inner Product Search", arXiv preprint arXiv:1507.05910v3, Nov. 2015, 10 pages.

Shen, et al., "Learning Binary Codes for Maximum Inner Product Search", In ICCV, 2015, pp. 4148-4156.

Du, et al., "Inner Product Similarity Search using Compositional Codes", CoRR,abs/1406.4966v2, Jun. 2014, pp. 1-20.

Fukunaga, et al., "A Branch and Bound Algorithm for Computing k-Nearest Neighbors", IEEE Transactions on computers, vol. 100, No. 7, Jul. 1975, pp. 750-753.

Norouzi, et al., "Cartesian k-means", IEEE Conference on Computer Vision and Pattern Recognition (CVPR), 2013, pp. 3017-3024.

Gong, et al., "Iterative Quantization: A Procrustean Approach to Learning Binary Codes", Proceedings of the 2011 IEEE Conference on Computer Vision and Pattern Recognition (CVPR), 2011, pp. 817-824.

Guo, et al., "Quantization based Fast Inner Product Search", arXiv preprint arXiv:1509.01469, Sep. 2015, 17 pages.

Halton, "A Combinatorial Proof of Cayley's Theorem on Pfaffians", Journal of Combinatorial Theory, vol. 1, 1966, pp. 224-232.

Kalantidis, et al., "Locally Optimized Product Quantization for Approximate Nearest Neighbor Search", Computer Vision Foundation, Jun. 2014, 8 pages.

Kingma, et al., "Adam: A Method for Stochastic Optimization", CoRR, abs/1412.6980v8, Jul. 2015, pp. 1-15.

Mikolov, et al., "Distributed Representations of Words and Phrases and their Compositionality", In Advances in Neural Information Processing Systems, 2013, 9 pages.

Nister, et al., "Scalable Recognition with a Vocabulary Tree", IEEE Computer Society Conference on Computer Vision and Pattern Recognition, 2006, pp. 2161-2168.

* cited by examiner

QUANTIZATION-BASED FAST INNER PRODUCT SEARCH

RELATED APPLICATION

This application is a non-provisional of, and claims priority to, U.S. Provisional Application No. 62/212,502, filed Aug. 31, 2015, entitled "Quantization-Based Fast Inner Product Search." The subject matter of this earlier filed application is incorporated herein by reference.

BACKGROUND

Many search tasks involve computing the inner product of a query vector with a set of database vectors to find database instances having the largest inner products (e.g., highest similarity). This is a Maximum Inner Product Search (MIPS) problem. But computation of the inner products via a linear scan requires O(nd) time and memory, which is prohibitive when the number of database vectors (n) and the dimensionality (d) is large. An inner product operation is also commonly referred to as a dot product.

SUMMARY

Implementations provide a fast approximation of the inner product that is orders of magnitude faster than a brute-force method while retaining high accuracy and a small memory footprint. The method includes projecting the database vectors into subspaces or chunks, so that each database entry, which is represented by a vector of floating point numbers, is divided into blocks of elements. The system may then quantize each of the database subspaces. Quantizing a vector assigns the subspace or block of the search item vector an identifier, which is an entry in a code book. The codebook for each subspace is learned after the database has been projected into subspaces and before each database entry is quantized. The codebook may be learned either by clustering or by optimizing a designed objective function. For clustering, the system may cluster the subspaces in the database while minimizing the mean squared error. The clustering may use Mahalanobis distance as the similarity measure, which uses a non-centered query covariance matrix based on example queries. Once clusters are formed, a cluster center is stored in the codebook as the data point for that cluster. If optimization of a task-dependent objective function is used, the system may use the set of example queries to generate the codebook, minimizing quantization error while using the example queries as soft constraints to improve the accuracy of the parameterized codebook. Once the codebook is generated, each subspace or block of the search items is assigned to a cluster and the system stores the identifier of the entry as the quantized search item. This reduces the amount of data stored for each search item vector.

When a query is received, the system chunks the query vector into the same number of subspaces as the search item vectors. The system may then compare the query vector to the quantized search items, one subspace at a time. For example, the system may, for a first chunk of the query, determine the cluster identifier for the first chunk of a search item vector and use that identifier to identify the data point for the cluster. The system may then perform the dot product between the chunk of the query and the data point. The approximated dot product, i.e., the similarity score, between the query and the database vector is the sum of the dot product results for each chunk. To further optimize the computation, the system may, after chunking the query, perform the dot product operation between each of the query chunks and each possible data point for that chunk in the codebook, storing the dot product value in a table. Thus, as the system compares the query chunk to each quantized search item, the system may use a table lookup to determine the dot product result, rather than calculating it each time.

According to one general aspect, a computer system includes at least one processor and memory. The memory stores a database of search items, the search items being represented by a vector of d elements. The memory also stores instructions that, when executed by the at least one processor, cause the system to perform operations. The operations include projecting each search item vector into K subspaces of i elements, where i=d/K, generating a codebook for each subspace, each entry in each codebook being a vector with i elements, the codebook being generated within constraints based on example queries, assigning each subspace of each search item an entry in the codebook for the subspace, the assignments for all subspaces of a search item representing a quantized search item, and storing the codebooks and the quantized search items in the memory.

According to one general aspect, a method includes generating a plurality of subspaces from search items in a database, the search items being represented as vectors of elements, a subspace being a block of elements from each search item that occur at the same vector position, generating a codebook for each subspace within soft constraints that are based on example queries, assigning each subspace of each search item an entry in the codebook for the subspace, the assignments for all subspaces of a search item representing a quantized search item, and storing the codebooks and the quantized search items.

According to one general aspect, a method includes generating a plurality of subspaces from search items in a database, the search items being represented as vectors of elements, a subspace being a block of elements from each search item that occur at the same vector position, generating a codebook for each subspace using optimization of a task-dependent objective function that minimizes quantization error within soft constraints established by example queries, and assigning each block of elements for each search item an entry in the codebook, generating a quantized search item. The method may also include projecting a query vector into the plurality of subspaces, using the quantized search item and the codebooks to perform an inner product search, and providing the search items with the highest similarity scores as responsive to the query.

In another aspect, a computer program product embodied on a computer-readable storage device includes instructions that, when executed by at least one processor formed in a substrate, cause a computing device to perform any of the disclosed methods, operations, or processes disclosed herein.

One or more of the implementations of the subject matter described herein can be implemented so as to realize one or more of the following advantages. As one example, implementations provide a data-dependent adaptive quantization based on learned codebooks that is more accurate and memory efficient than binary encoding of the data or encoding the data as a tree. Implementations lead to an accurate and fast search, yielding higher accuracy with a much lower memory footprint. The memory savings make implementations attractive and possible in a mobile domain. For instance, for a database containing 1 million vectors, each in 1000 dimensional real-valued space, the cost of loading in memory will be 4 GB, which is infeasible for processing on mobile platforms. On the other hand, the disclosed quantization can store the entire database in less than 50 MB while retaining high accuracy.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
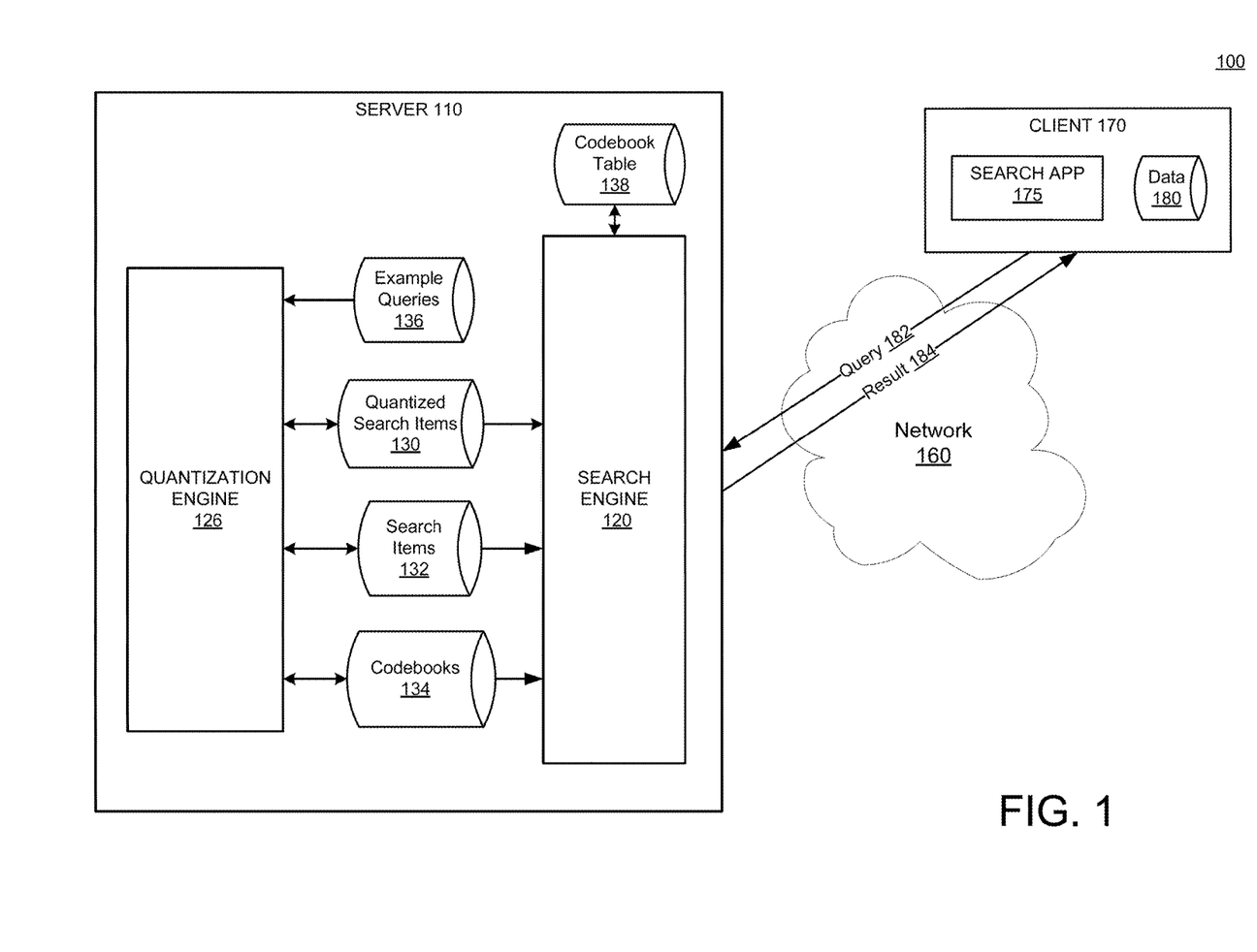
FIG. 1 illustrates an example system in accordance with the disclosed subject matter.

FIG. 1 is a block diagram of a scalable inference system in accordance with an example implementation. The system 100 may be used to quantize a database of search items and generate a codebook based on example queries. The system may then use the codebook and quantized vectors to determine search items responsive to a query at query time using an inner product search. The depiction of system 100 in FIG. 1 is described as a server-based search system. However, other configurations and applications may be used. For example, some operations may be performed on a client device. Furthermore, while the system 100 is described as a search system, the methods and techniques of disclosed implementations can be used in any task that uses a Maximum Inner Product, such as classifications for example.

Figure 6:
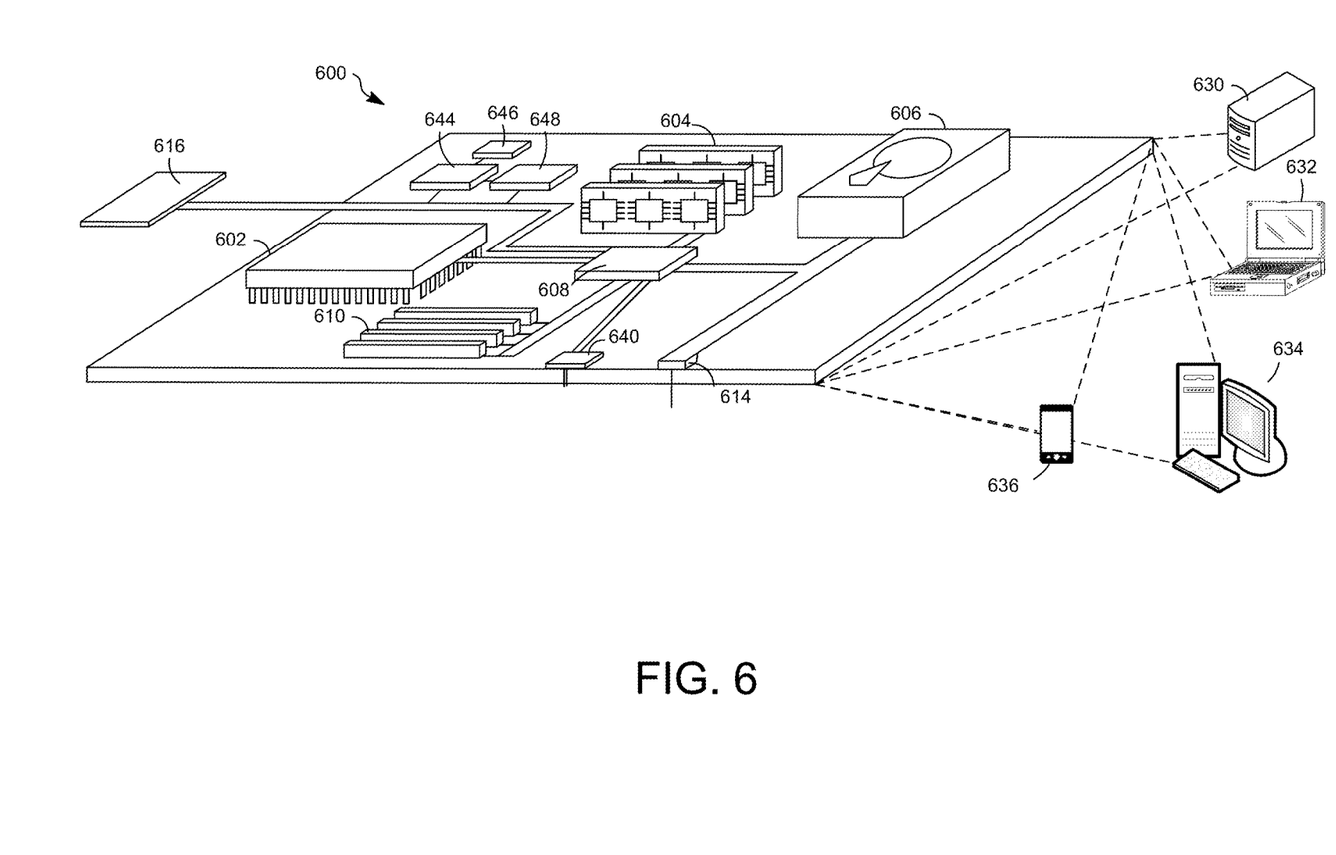
FIG. 6 shows an example of a computer device that can be used to implement the described techniques.
Figure 7:
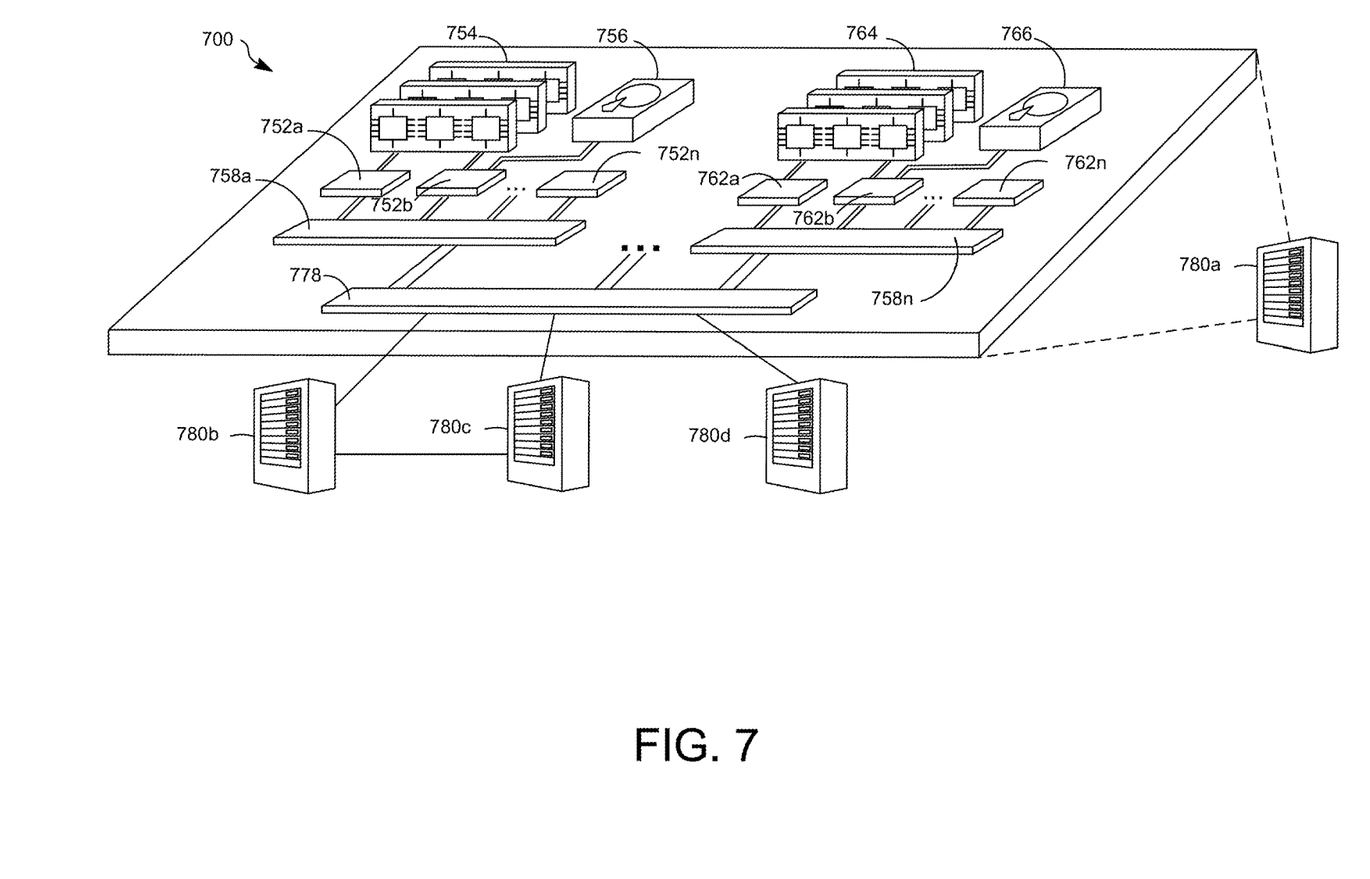
FIG. 7 shows an example of a distributed computer device that can be used to implement the described techniques.

The scalable inference system 100 may be a computing device or devices that take the form of a number of different devices, for example a standard server, a group of such servers, or a rack server system, such as server 110. In addition, system 100 may be implemented in a personal computer, for example a laptop computer. The server 110 may be an example of computer device 600, as depicted in FIG. 6 or computer device 700, as depicted in FIG. 7.

Although not shown in FIG. 1, the server 110 can include one or more processors formed in a substrate configured to execute one or more machine executable instructions or pieces of software, firmware, or a combination thereof. The processors can be semiconductor-based—that is, the processors can include semiconductor material that can perform digital logic. The server 110 can also include an operating system and one or more computer memories, for example a main memory, configured to store one or more pieces of data, either temporarily, permanently, semi-permanently, or a combination thereof. The memory may include any type of storage device that stores information in a format that can be read and/or executed by the one or more processors. The memory may include volatile memory, non-volatile memory, or a combination thereof, and store modules that, when executed by the one or more processors, perform certain operations. In some implementations, the modules may be stored in an external storage device and loaded into the memory of server 110.

The modules may include a quantization engine 126 and a search engine 120. The quantization engine 126 may quantize a database of search items 132 and, in the process, generate codebook 134. The resulting quantized search items 130 and codebook 134 uses much less memory than the database of search items 132. The quantization engine 126 may use a set of example queries 136 in the generation of the codebook 134. The example queries 136 may be queries submitted to the search engine 120. The search items 132 may be a database of vectors. A vector may be thought of as an array of floating point numbers with a dimensionality of d, or in other words an array with d positions. A query, such as those in example queries 136, may also be expressed as vectors of dimension d. When d is large and the number of database entries is large (e.g., tens of thousands or even millions), computation of an inner product between a query vector and the database entries is slow and processor-intensive.

Figure 2:
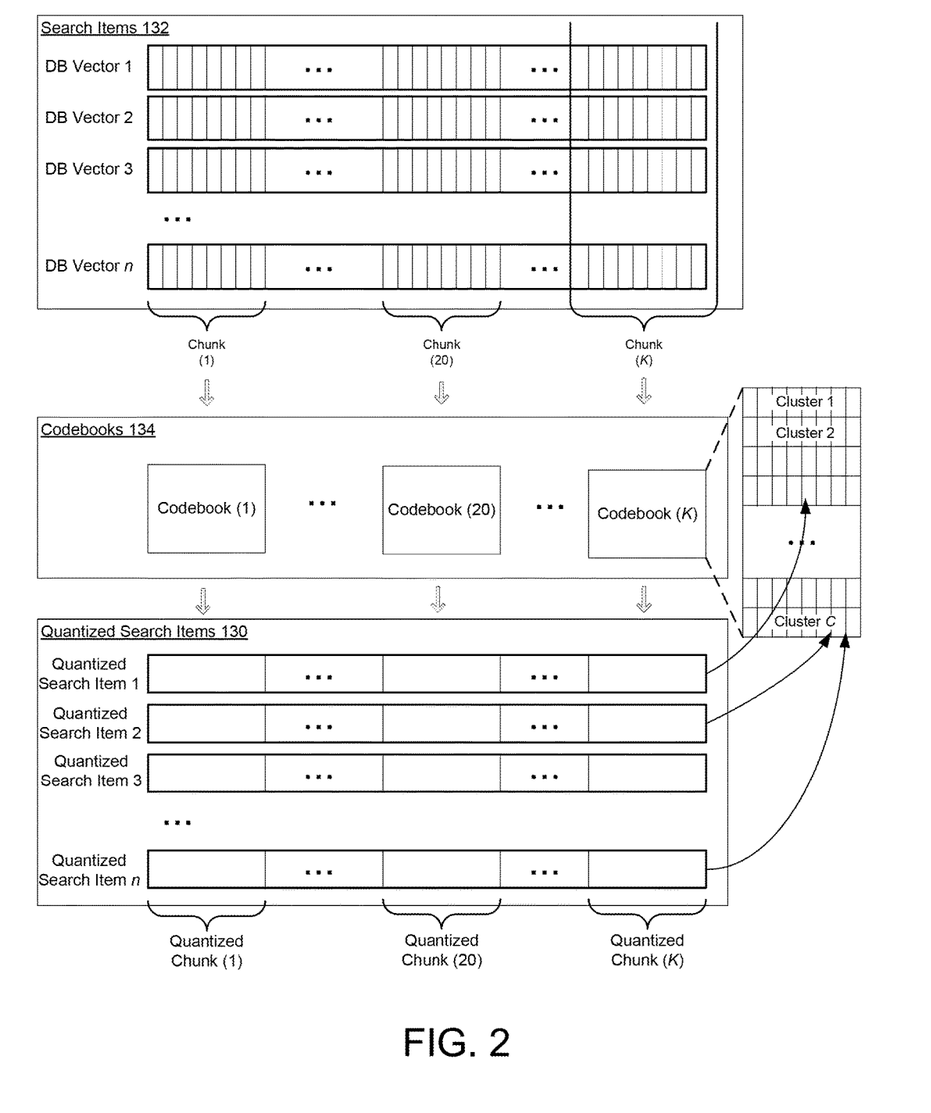
FIG. 2 illustrates a block diagram of quantization of database vectors representing search items, in accordance with disclosed subject matter.

To enable faster computation time while retaining a high level of accuracy, the quantization engine 126 may quantize the search items 132. The quantization engine 126 may map each search item vector to a set of subspaces and then quantize the vector in each subspace using a codebook generated for the subspace. FIG. 2 illustrates example search items 132 and quantized search items 130. In the example of FIG. 2, the search items 132 include n entries, or n distinct search items. Each search item 132 (e.g., database vector 1, database vector 2, etc.) has d dimensions, or in other words d elements. In some implementations, the quantization engine 126 may first permute the vector elements using a random (but fixed) permutation. In some implementations, the quantization engine 126 may perform random rotation of the vectors. Random rotation or permutation may be used to achieve equal distribution of information in the various subspaces generated by dividing the vectors. For example, when some subspaces carry more information than other subspaces, the approximation can suffer degraded performance. The degradation may be minimized by random rotation or random permutation. In some implementations, no permutation or random rotations are performed. The quantization engine 126 then projects the vectors into K subspaces. In other words, a subspace is a block of elements from each search item vector occurring at the same vector position. In some implementations, d is divisible by K so that each block includes the same number of elements. Such an implementation is shown in FIG. 2, where each subspace is a block of eight elements. In some implementations, even where d is divisible by K, direct division may result in subspaces where the number of elements in each subspace is not equal. In some implementations, division may be based on random or learned projection of the vectors. In such implementations, the number of elements in each block may not be equal. A subspace is the collection of the block of elements from each of the search items. In other words, as illustrated in FIG. 2, the division results in K subspaces or chunks, each with n rows of eight elements.

Once the vectors are projected into subspaces, the quantization engine 126 may generate codebooks 134. The codebooks 134 may include one codebook for each subspace. Thus, using the example of FIG. 2, the codebooks 134 include K codebooks. In some implementations, the codebooks for each subspace may be referred to collectively as a codebook for the search items 132. Each codebook may include an entry for each of C clusters. The quantity of clusters, C, may be determined as the codebook is generated or the quantity C may be passed in as a parameter to the quantization engine 126. For example, the parameter may indicate that the quantization engine 126 should generate 256 clusters for each codebook. When clusters are generated, each cluster will have a cluster center, or in other words a data point that best represents the cluster. The cluster center is the entry for that cluster in the codebook. For example, in FIG. 2, subspace K (i.e., Chunk (K)) has 8 elements from each of n vectors. The quantization engine 126 may cluster the n vectors of 8 elements each into one of 256 clusters (e.g., C=256). For example, database vector 2, subspace 3 may be the cluster center for cluster 1 of the codebook for subspace 3. Thus, the codebook entry for cluster 1 may be the 8 elements from database vector 2 or may be a pointer to the 8 database elements. Of course the cluster center need not match a database vector subspace, but may represent 8 elements that serve as the cluster center. For the ease of discussion the codebook for the $k^{th}$ subspace may be represented by $U^{(k)}$. Because each code book has C entries, an entry into the $c^{th}$ codebook may be represented by $U_c^{(k)}$.

To generate the clusters for the codebook, the quantization engine 126 may use a variety of methods. For example, the quantization engine 126 may use conventional clustering algorithms based on a Euclidean distance or k-means, solved in each subspace independently. However, to achieve a lower quantization error, the quantization engine 126 may use a set of example queries Q to generate a non-centered covariance matrix $\Sigma_Q$ and use the query covariance matrix to perform clustering using a Mahalanobis distance. In some implementations, using the Mahalanobis distance in clustering may be represented by iteratively alternating between the following two steps:

$$c_x^{(k)} = \mathrm{argmin}(x^{(k)} - U_c^{(k)})^T \sum_Q^{(k)} (x^{(k)} - U_c^{(k)}), \alpha_x^{(k)}[c_x^{(k)}] = 1 \quad (1)$$

$$U_c^{(k)} = \frac{\sum_{x^{(k)} \in S_c^{(k)}} x^{(k)}}{|S_c^{(k)}|} \forall c \quad (2)$$

where $c_x^{(k)}$ is the cluster assignment for the $k^{th}$ subspace of database vector x, and $S_c^{(k)}$ is the set of database vectors in the $k^{th}$ subspace assigned to cluster c. The use of the query covariance matrix results in cluster assignments that more closely reflect real-world usage, which increases the accuracy of the quantization.

In some implementations, the system may assign database vectors to an entry in the codebook via a C-dimensional one-hot assignment vector $\alpha_x^{(k)}$. A one-hot assignment vector for the $k^{th}$ subspace of vector x (e.g., $\alpha_x^{(k)}$) may be all zeros except for the position that represents the cluster assignment for the $k^{th}$ subspace of x. The $\alpha_x^{(k)}[c_x^{(k)}]=1$ portion of the first step above sets the appropriate hot position in the assignment vector using the cluster assignment. In some implementations, the assignment vectors for x (e.g., $\alpha_x$) may be the quantized search item. In other words, in some implementations, the assignment vector $\alpha_x^{(k)}$ may be the element represented for quantized chunk (k). The dot product of the assignment vector and the codebook entry for the $k^{th}$ subspace may thus provide the quantization for the $k^{th}$ subspace of vector x. In some implementations, the element in the quantized chunk (k) may be a pointer to the codebook entry that represents the cluster assignment for the $k^{th}$ subspace of the vector. In other words, the value in the quantized chunk (1) of quantized search item 1 in quantized search items 130 of FIG. 2 may be 5, which indicates the $5^{th}$ codebook entry of codebook (1). Likewise, the value in quantized search item 1, chunk (K) may be the $4^{th}$ codebook entry, as illustrated in FIG. 2. The quantization engine may store the quantized search items 130 and the codebooks 134 for use by the search engine 120.

In some implementations, the quantization engine may use optimization of a task-dependent objective function to generate the codebooks 134. Optimization of a task-dependent objective function may use the set of example queries to modify the learning criteria by imposing additional constraints and minimizing expected quantization error. When using optimization of a task-dependent objective function, the quantization engine 126 may find the database vector $x_q^*$ that has the largest dot product with an example query q. While the quantization engine 126 may seek to ensure the dot product of the query q to the quantizer of $x_q^*$ to be larger than the dot product of any other quantizer, the quantization engine 126 may make this a soft constraint—e.g., desired but not mandatory. The task-dependent objective may be expressed as $$\mathrm{argmin}_{U^{(k)}, A^{(k)}} \Xi \sum_{q \in Q} \sum_{x \in X} \sum_k (q^{(k)T}(x^{(k)} - U^{(k)}\alpha_x^{(k)}))^2 +$$

$$\lambda \sum_{q \in Q} \sum_{x \in X} \left[ \sum_k q^{(k)T} \left( U^{(k)}\alpha_x^{(k)} - U^{(k)}\alpha_{x_q^*}^{(k)} \right) \right]_+$$

where $\mathbb{E}$ is the expectation over queries, $A^{(k)}$ is a matrix containing the $k^{th}$ subspace assignment vectors $\alpha_x^{(k)}$ for all database vectors, $\lambda$ is a nonnegative coefficient assigned by the system (e.g., 0.01), Q is the set of example queries, and $$[z]_+ = \max(z, 0)$$

is the standard Hinge loss. From this objective, the quantization engine may initialize the codebook $U^{(k)}$ with a set of random database vectors and iterate between solving $U^{(k)}$ (the codebook) and $A^{(k)}$ (e.g., the assignment vectors) for each subspace k. In some implementations, the quantization engine may iterate through three steps. The first step may be to find a set of violated constraints. The set of violated constraints may be bounded, for example including at most J violations. This reduces the complexity and processing time of this first step. The set of violated constraints may be represented as W, with $W_j$ representing the $j^{th}$ violation. The violations may be expressed as a triplet of an example query ($q_j$), the database vector that has the maximum dot product with the query ($x_{q_j}^*$), and the database vector ($x_j^-$) having a quantization the results in a higher dot product than $x_{q_j}^*$. In other words, $$q_j^T x_{q_j}^* \geq q_j^T x_j^- \text{ but } \sum_k q_j^{(k)T} U^{(k)} \alpha_{x_{q_j}^*}^{(k)} < \sum_k q_j^{(k)T} U^{(k)} \alpha_{x_{q_j}^-}^{(k)}$$

The second step may fix the cluster assignments. For example, the system may, for each violation, determine the cluster assignment according to $$c_x^{(k)} = \operatorname*{argmin}_c \left( (x^{(k)} - U_c^{(k)})^T \sum_Q^{(k)} (x^{(k)} - U_c^{(k)}) + \lambda \left( \sum_j q^{(k)T} U_c^{(k)} (\mathbb{1}[x = x_j^-] - \mathbb{1}[x = x_{q_j}^*]) \right), \alpha_x^{(k)}[c_x^{(k)}] = 1$$

The third step may fix the codebook by gradient descent. In some implementations, the gradient descent may be determined according to $$\nabla U_c^{(k)} = 2 \sum_Q^{(k)} \sum_{x \in X} \alpha_x^{(k)}[c] (U_c^{(k)} - x^{(k)}) + \lambda \sum_j \left( q_j^{(k)} \left( \alpha_{x_j^-}^{(k)}[c] - \alpha_{x_{q_j}^*}^{(k)}[c] \right) \right)$$

which is derived from the objective expressed above. In some implementations, the third step may be modified as a perturbation of the stationary point of the first term with a single gradient step of the second term. In some implementations, to limit the computational time of the three steps, the system may limit the iterations. For example, the system may limit the iterations to 30.

Once the quantization engine has generated the codebooks 134 and quantized vectors, e.g., quantized search items 130, the system 100 is ready to use the codebooks 134 and quantized search items 130 to respond to queries. The modules may thus include search engine 120. The search engine 120 may be configured to use the codebooks 134 and quantized search items 130 to identify search items 132 that are responsive to a query 182 and to provide a search result 184 in response to the query 182. The search engine 120 may include modules or engines that create a query vector from the query 182 using conventional techniques and may also project the query vector into subspaces. The subspaces that the query vector is projected into match the subspaces that the search items 132 are projected onto. Thus, the query vector may have K subspaces.

In some implementations, the search engine 120 may generate codebook table 138. Codebook table 138 may store the result of the inner product of each cluster center in each subspace with the corresponding subspace of the query vector. Thus, the system may pre-compute the inner product between each data point in each codebook and the corresponding query vector subspace and store the result in the codebook table 138. This may result in a table or database where the result of the inner product can be accessed by knowing the codebook entry identifier for the subspace (e.g., which cluster in which subspace). The search engine may use this table to substantially speed up the search, as will be explained below.

The search engine 120 may then determine the inner product of each quantized search item and the query in each subspace. To accomplish this, the search engine 120 may, for each quantized database vector, determine the codebook assignment in each subspace and determine the inner product of the data point represented by the code book assignment in that subspace and the corresponding subspace of the query vector. In implementations that use the codebook table 138, the system may do a lookup in the table for the codebook entry and subspace. Thus—rather than perform the inner product operation between the query and the quantized search item (i.e., the codebook entry assignment for the search item), the search engine 120 can use a lookup into the codebook table 138. In other implementations, the system may perform the inner product. The search engine 120 may approximate the final inner product between the search item and the query as the sum of the results of the inner product in each subspace between the quantized search item and the query. Thus, for example, the approximate inner product between a search item x and the query q may be expressed as $$q^T x \approx \Sigma_k q^{(k)T} U^{(k)} \alpha_x^{(k)}.$$

Once the search engine 120 has determined search items with the highest inner product using the approximation above, the search has determined the search results. In some implementations, the search engine 120 may include a ranking engine that orders the search results 184 by the similarity score, i.e., the highest inner products. The search engine 120 may provide the search results 184 for display at a client device, such as client 170.

Scalable inference system 100 may be in communication with client(s) 170 over network 160. Clients 170 may allow a user to provide query 182 to the search engine 120 and to receive search result 184, which includes search items found responsive to the query based on the approximate inner product with the search query using the quantized search items. Network 160 may be for example, the Internet or the network 160 can be a wired or wireless local area network (LAN), wide area network (WAN), etc., implemented using, for example, gateway devices, bridges, switches, and/or so forth. Via the network 160, the scalable inference system 100 may communicate with and transmit data to/from clients 170. In some implementations, the client 170 may include applications, such as search app 175 that performs some or all of the functions of the search engine 120. For example, the quantized search items 130 do not take up much memory compared to search items 132 and may be of a size suitable for storage on the client, such as in data store 180. Data store 180 may include any type of non-volatile memory, such as flash, SD, RAM, disk, etc. The server 110 may transmit the quantized search items 130 and the codebooks 134 to the client 170 and the search app 175 may perform the actions described above with regard to search engine 120.

In some implementations, scalable inference system 100 may be in communication with or include other computing devices that provide updates to the search items 132 and example queries 136. Scalable inference system 100 represents one example configuration and other configurations are possible. In addition, components of system 100 may be combined or distributed in a manner differently than illustrated. For example, in some implementations one or more of the search engine 120 and the quantization engine 126 may be combined into a single module or engine. In addition, components or features of the search engine 120, the quantization engine 126 may be distributed between two or more modules or engines, or even distributed across multiple computing devices.

Figure 3:
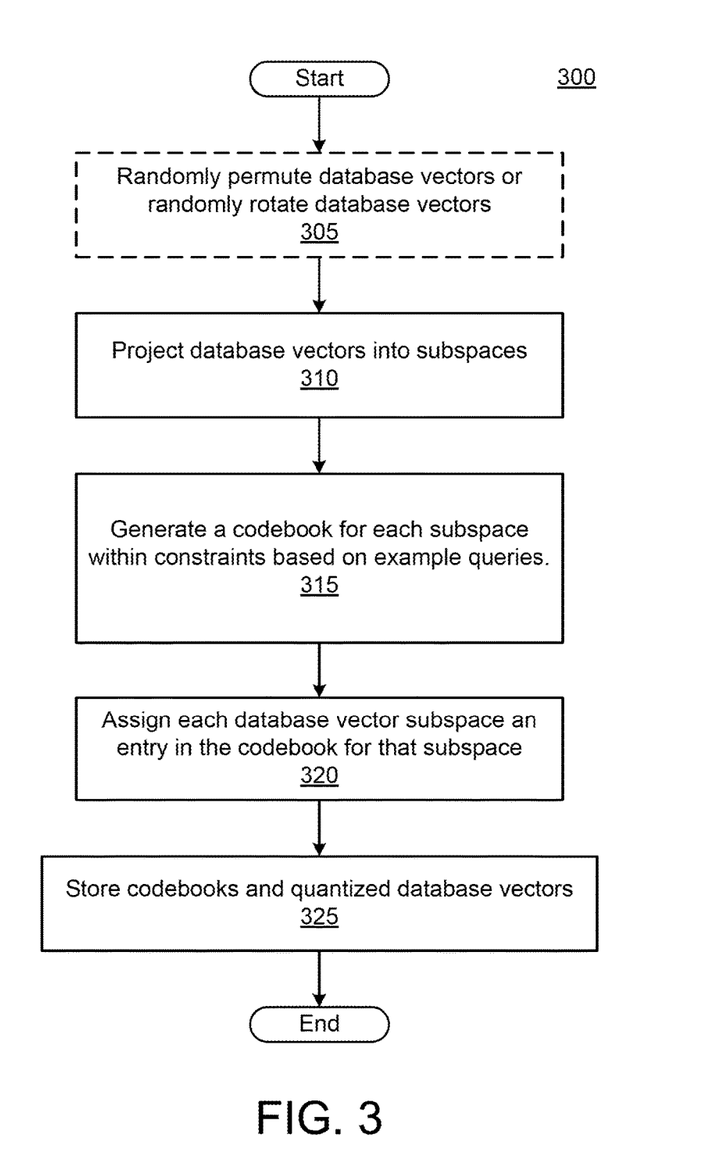
FIG. 3 illustrates a flow diagram of an example process for preparing a database of search items for a fast inner product search, according to an implementation.

FIG. 3 illustrates a flow diagram of an example process 300 for preparing a database of search items for a fast inner product search, according to an implementation. Process 300 may be performed by a scalable inference system, such as system 100 of FIG. 1. Process 300 is an example of quantization of search items, performed by quantization engine 126 of FIG. 1. Process 300 may be performed periodically by the system so that the quantized search items and codebooks generated stay current. For example, the system may perform process 300 once a day, once a week, once an hour, etc. depending on how often the database of search items is updated with new items. Process 300 may begin with the scalable inference system performing a permutation on the search items, i.e., the database vectors (305). In some implementations, the permutation may be a random, but fixed, permutation. In other words, the permutation is randomly generated but once the permutation is generated it is fixed and can be applied to all database vectors and all query vectors. In some implementations, the system may perform random rotation of the vectors instead of permutation. In some implementations, step 305 is optional and the database vectors are left unchanged.

The system may project the database vectors into subspaces (310). In some implementations, each subspace may have an equal number of elements from the vector. In some implementations, the subspaces may not have equal numbers of elements. The subspaces may also be referred to as chunks. The system may then generate a codebook for each subspace within constraints based on example queries (315). In some implementations, the system may use a clustering algorithm that uses Mahalanobis distance. The Mahalanobis distance may use a non-centered query covariance matrix generated from a set of example queries. The example queries may be, for example, the search queries received by the system within a time period ending just before process 300 begins. For instance, the set of example queries may be queries received in the minute, 10 minutes, or hour ending just before process 300 begins. In some implementations, the system may assume that the covariance of the queries is the same as that of the database (e.g., $\Sigma_Q = \Sigma_X$). In some implementations, the system may assume that the covariance of the queries is identity (e.g., $\Sigma_Q \propto I$), which leads to a standard k-Means formulation. Thus, some implementations may use Mahalanobis distance that is not based on a set of example queries. In some implementations, the system may use optimization of a task-dependent objective function to generate the codebooks, using soft constraints represented by the set of example queries. Codebook generation using optimization of a task-dependent objective function is described in more detail with regard to FIGS. 1 and 5. A codebook for a particular subspace ends up with a data point or cluster center that represents the cluster The data point has the same number of elements as the portion of the search item vectors in the subspace.

The system may assign each database vector subspace an entry in the codebook (320). In other words, each subspace has a codebook, and each codebook has C entries. The value of C may depend on parameters provided to the procedure that generates the codebooks or the procedure may determine the value based on the data. Each database vector subspace may be mapped or assigned to one of the C entries in the codebook for the subspace. In some implementations, the assignment may occur as part of generating the code book. For example, when clustering is used, each database vector subspace may be assigned to one of the clusters, as the clusters are generated from the database vectors in a subspace. The assignment determined as part of generating the codebook in step 315 may be recorded in step 320 as quantized search items. In other words, the quantized search items are the assignment of a codebook entry to each chunk of the database vector. In some implementations, the assignment may be stored as an index into the codebook for the subspace. In some implementations, the assignment may be in the form of a one-hot assignment vector. The system may store the codebooks and the quantized search items in a data store (325). Process 300 then ends, having generated structures that can be used to approximate the inner product between query items and the search items in an efficient manner.

Figure 4:
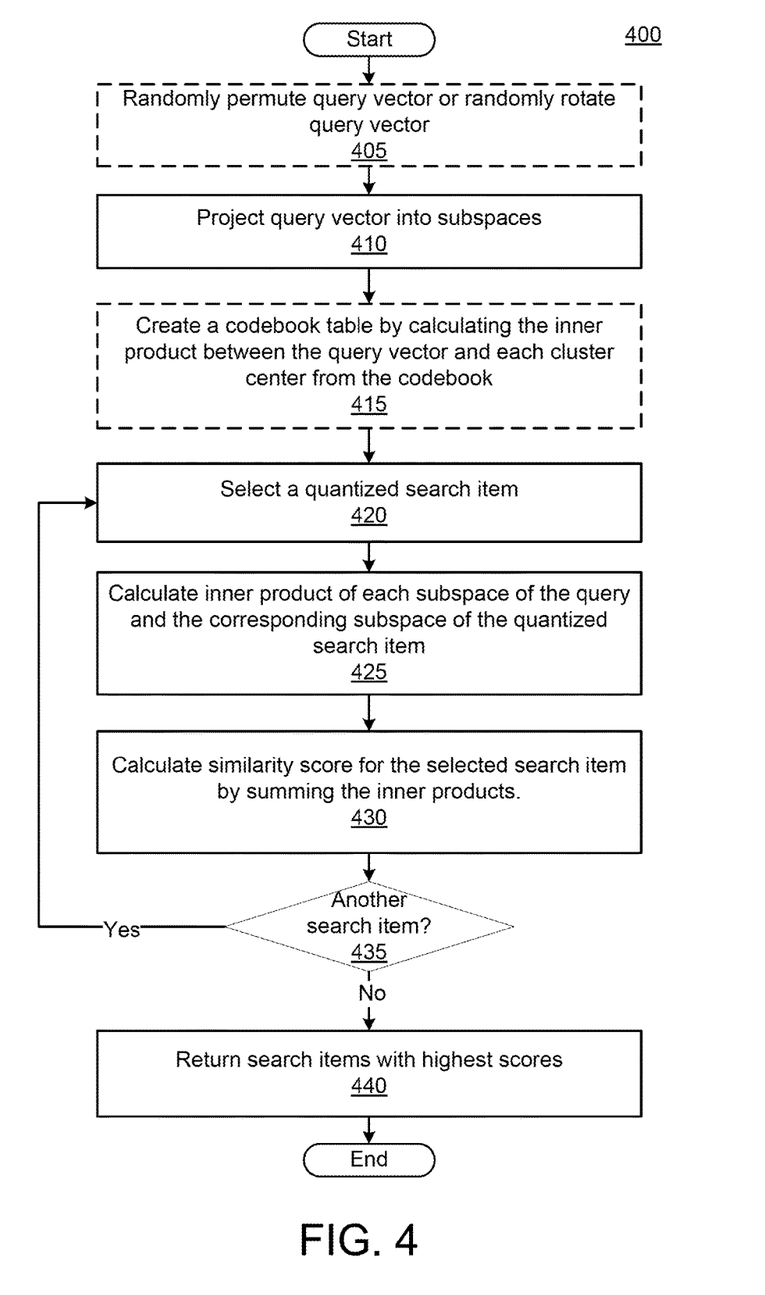
FIG. 4 illustrates a flow diagram of an example process for identifying responsive search items using the fast inner product search, in accordance with disclosed subject matter.

FIG. 4 illustrates a flow diagram of an example process 400 for identifying responsive search items using the fast inner product search, in accordance with disclosed subject matter. Process 400 may be performed by a scalable inference system, such as system 100 of FIG. 1. Process 400 may be performed each time a query is received in order to determine the search items that have a maximum inner product with the query vector. Those items with the highest inner product are most responsive to the query, or in other words most like the query. Process 400 may begin with the scalable inference system randomly permuting the query vector elements or randomly rotating the query vector elements (405). This step will use the same permutation or rotation used in step 305 of FIG. 3, and is only performed if the database vectors were subject to the rotation or permutation. The scalable inference system may also project the query vector into subspaces (410). The projection of the query vector is done in the same manner as projection of the search item vectors as part of step 310 in FIG. 3. The system may then optionally generate a codebook table (415). The codebook table may include one entry for each entry of each codebook. To generate the table the system may perform, for each subspace (i.e., each codebook), an inner product between the elements of the query vector in the subspace and the elements of each codebook entry in the subspace. Thus, if a codebook has C entries, the codebook table will have C entries for that subspace. The system may use the codebook table to speed calculation of the inner products with quantized search items as part of step 425 below, but use of a codebook table is optional.

The system may then compute similarity score for each search item. Accordingly, the system may select the quantized search item (420) and calculate, for each subspace, the inner product between the query elements in that subspace and the quantized search item (425), which is represented by a codebook entry assignment in the subspace. For example, in some implementations, the system may determine the codebook entry from the subspace of the quantized search item, determine the data point (e.g., cluster center) for the codebook entry, and compute the inner product between the query subspace and the data point. In implementations that use the codebook table, the system may determine the codebook entry and lookup the inner product result for that codebook entry in the codebook table. The system may calculate a similarity score for the search item (430) by summing the inner product of each subspace, as calculated in step 425. The similarity score is an approximate inner product between the quantized search item and the query. If the query and search item vectors are projected into K subspaces, the system may sum K values, each representing an inner product calculation for a subspace. The system may repeat steps 420 to 430 (435, Yes) until a similarity score has been computed for each search item (435, No). The system may then return the search items, e.g., identifiers that identify the search items or the database vectors themselves, that have the highest similarity scores (440).

In some implementations, the system may rescore the top scoring search items using an exact dot product computation. In other words, the system may compute an exact dot product for the items that have highest similarity scores and use the exact dot products to determine the search items that will be presented to the query requestor. For example, the system may use N items as the search result for the query requestor and compute the exact dot product between the query vector and the search item vectors for the top 10*N search items, e.g., those 10*N with the highest similarity scores as determined using the quantized vectors. The system may then use the top N search items with the highest actual dot product. This increases the accuracy of the search result, but requires much less time to determine than computing dot products for all search items. The system may provide a search result that includes information about those items for display to the user who provided the query. Process 400 then ends, having identified the most responsive items.

Figure 5:
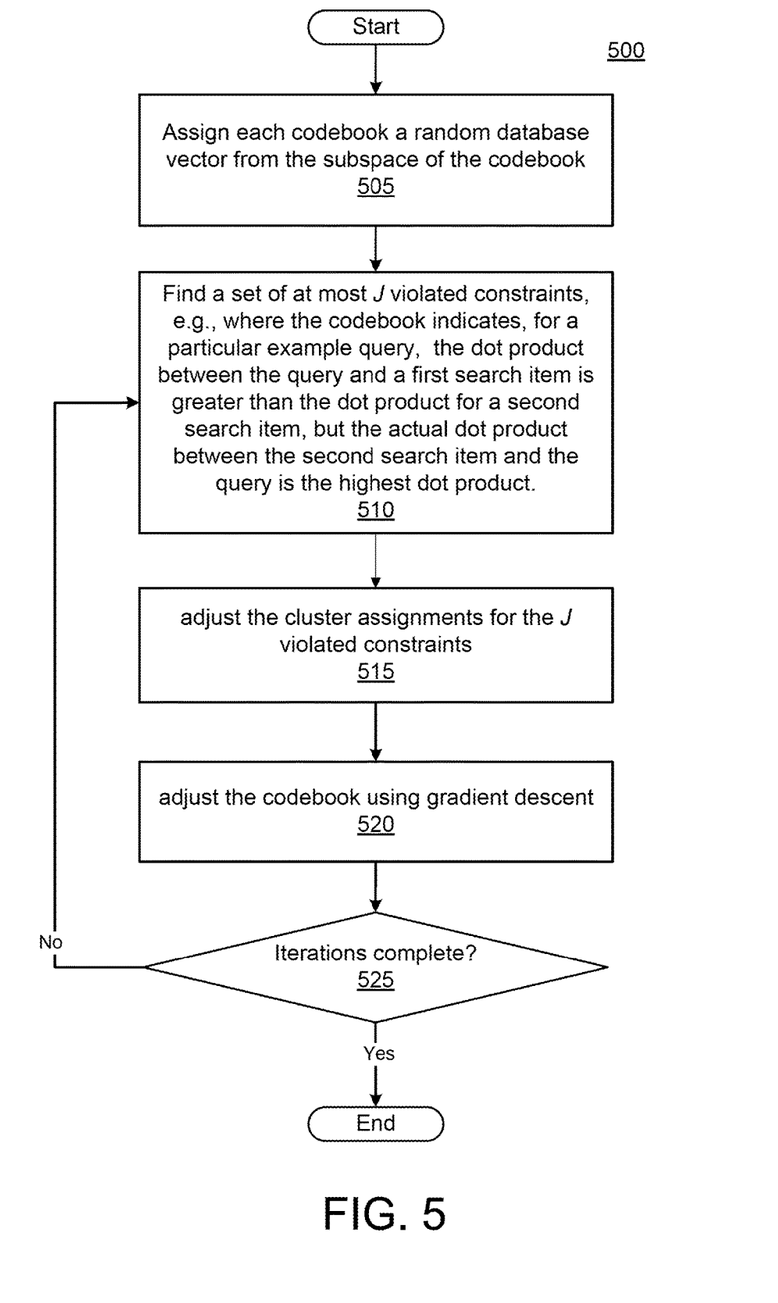
FIG. 5 illustrates a flow diagram of an example process for generating a codebook using optimization of a task-dependent objective function, in accordance with disclosed subject matter.

FIG. 5 illustrates a flow diagram of an example process 500 for generating a codebook using optimization of a task-dependent objective function, in accordance with disclosed subject matter. Process 500 may be performed by a scalable inference system, such as system 100 of FIG. 1. Process 500 trains and optimizes a task-dependent objective function to predict clusters using a set of example queries. In other words, process 500 uses a set of example queries to provide soft constraints while minimizing the expected quantization error. Process 500 uses an iterative process to alternate between solving the codebook and the assignments of the search item subspaces to a codebook entry. Process 500 may be performed as part of steps 315 and 320 of FIG. 3. Process 500 may begin with the scalable inference system assigning each codebook entry a random database vector for that subspace (505). In other words, the system may, for each subspace, select one database vector from that subspace as a codebook entry. Thus if the codebook has C entries, the system may select C random database vectors from the subspace. The system may then find a set of violated constraints (510). The system may limit the set of a predetermined number, e.g., the first 1000 violations found, which speeds up processing time for each iteration. A violated constraint occurs when the codebook indicates a dot product between a first quantized search item and the query is greater than that of a dot product between a second quantized search item and the query, but the second search item (i.e., the original search item vector) actually has a highest dot product with the query. In other words, the approximation indicates the first search item has a higher dot product than the second search item, but the actual dot product of the query and the second item is the maximum dot product.

The system may then adjust the codebook assignments for the detected violations (515). In other words, for each subspace, the system may find the cluster that the violation, e.g., the first search item from the example above. In some implementations, the system may evaluate all possible cluster assignments, picking the best one. This is possible because C is typically small, e.g., 256. In some implementations, the process of selecting a cluster assignment may be expressed as $$c_x^{(k)} = \operatorname*{argmin}_c \left( (x^{(k)} - U_c^{(k)})^T \sum_Q^{(k)} (x^{(k)} - U_c^{(k)}) + \lambda \left( \sum_j q^{(k)T} U_c^{(k)} (\mathbb{1}[x = x_j^-] - \mathbb{1}[x = x_{q_j}^*]) \right), \alpha_x^{(k)}[c_x^{(k)}] = 1 \right)$$

where $\Sigma_Q^{(k)}$ is the non-centered query covariance matrix for the subspace k generated from the set of queries, $A^{(k)}$ is a matrix containing the $k^{th}$ subspace assignment vectors $\alpha_x^{(k)}$ for all database vectors, $\lambda$ is a nonnegative coefficient assigned by the system (e.g., 0.01), and $x_j^-$ is the search item that violated the constraint for query q. When no violations are found in step 510, the cluster assignment is equivalent to finding the nearest neighbor of $x^{(k)}$ in the codebook (i.e., $U^{(k)}$) in Mahalanobis space defined by the non-centered query covariance matrix.

The system may then adjust the codebook using gradient descent (520). In some implementations, this may be expressed as $$\nabla U_c^{(k)} = 2 \sum_Q^{(k)} \sum_{x \in X} \alpha_x^{(k)}[c](U_c^{(k)} - x^{(k)}) + \lambda \sum_j \left( q_j^{(k)} \left( \alpha_{x_j^-}^{(k)}[c] - \alpha_{x_{q_j}^*}^{(k)}[c] \right) \right)$$

In other words, the system may adjust the codebook elements in such as way that the violations no longer appear as having an approximation that is larger than the search item having the largest dot product.

The system may determine whether additional iterations of the above steps are needed (525). If no violations were found in step 510, the iterations may be complete. If the iterations reach a set number (e.g., 30), the iterations may be complete. If they iterations are not complete (525, No), the system may continue looking for violations, adjusting the assignments, and adjusting the codebook. If the iterations are complete (525, Yes), process 500 ends, having generated the codebooks based on example queries using optimization of a task-dependent objective function.

FIG. 6 shows an example of a generic computer device 600, which may be server 110, and/or client 170 of FIG. 1, which may be used with the techniques described here. Computing device 600 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 600 includes a processor 602, memory 604, a storage device 606, and expansion ports 610 connected via an interface 608. In some implementations, computing device 600 may include transceiver 646, communication interface 644, and a GPS (Global Positioning System) receiver module 648, among other components, connected via interface 608. Device 600 may communicate wirelessly through communication interface 644, which may include digital signal processing circuitry where necessary. Each of the components 602, 604, 606, 608, 610, 640, 644, 646, and 648 may be mounted on a common motherboard or in other manners as appropriate.

The processor 602 can process instructions for execution within the computing device 600, including instructions stored in the memory 604 or on the storage device 606 to display graphical information for a GUI on an external input/output device, such as display 616. Display 616 may be a monitor or a flat touchscreen display. In some implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk. In some implementations, the memory 604 may include expansion memory provided through an expansion interface.

The storage device 606 is capable of providing mass storage for the computing device 600. In one implementation, the storage device 606 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 604, the storage device 606, or memory on processor 602.

The interface 608 may be a high speed controller that manages bandwidth-intensive operations for the computing device 600 or a low speed controller that manages lower bandwidth-intensive operations, or a combination of such controllers. An external interface 640 may be provided so as to enable near area communication of device 600 with other devices. In some implementations, controller 608 may be coupled to storage device 606 and expansion port 614. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 630, or multiple times in a group of such servers. It may also be implemented as part of a rack server system. In addition, it may be implemented in a personal computer such as a laptop computer 622, or smart phone 636. An entire system may be made up of multiple computing devices 600 communicating with each other. Other configurations are possible.

FIG. 7 shows an example of a generic computer device 700, which may be server 110 of FIG. 1, which may be used with the techniques described here. Computing device 700 is intended to represent various example forms of large-scale data processing devices, such as servers, blade servers, datacenters, mainframes, and other large-scale computing devices. Computing device 700 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 700 may include any number of computing devices 780. Computing devices 780 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 780a includes multiple racks 758a-758n. Each rack may include one or more processors, such as processors 752a-752n and 762a-762n. The processors may include data processors, network attached storage devices, and other computer controlled devices. In some implementations, one processor may operate as a master processor and control the scheduling and data distribution tasks. Processors may be interconnected through one or more rack switches 758, and one or more racks may be connected through switch 778. Switch 778 may handle communications between multiple connected computing devices 700.

Each rack may include memory, such as memory 754 and memory 764, and storage, such as 756 and 766. Storage 756 and 766 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 756 or 766 may be shared between multiple processors, multiple racks, or multiple computing devices and may include a computer-readable medium storing instructions executable by one or more of the processors. Memory 754 and 764 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 754 may also be shared between processors 752a-752n. Data structures, such as an index, may be stored, for example, across storage 756 and memory 754. Computing device 700 may include other components not shown, such as controllers, buses, input/output devices, communications modules, etc.

An entire system, such as system 100, may be made up of multiple computing devices 700 communicating with each other. For example, device 780a may communicate with devices 780b, 780c, and 780d, and these may collectively be known as system 100. As another example, system 100 of FIG. 1 may include one or more computing devices 700. Some of the computing devices may be located geographically close to each other, and others may be located geographically distant. The layout of system 700 is an example only and the system may take on other layouts or configurations.

According to one aspect, a computer system includes at least one processor and memory. The memory stores a database of search items, the search items being represented by a vector of d elements. The memory also stores instructions that, when executed by the at least one processor, cause the system to perform operations. The operations include projecting each search item vector into K subspaces of i elements, where i=d/K, generating a codebook for each subspace, each entry in each codebook being a vector with i elements, the codebook being generated within constraints based on example queries, assigning each subspace of each search item an entry in the codebook for the subspace, the assignments for all subspaces of a search item representing a quantized search item, and storing the codebooks and the quantized search items in the memory.

These and other aspects can include one or more of the following features. For example, assigning each subspace of each search item an entry in the codebook can include generating an assignment vector with exactly one vector element being a 1 and remaining vector elements being 0, the 1 corresponding to an entry in the codebook. As another example, the operations may also include projecting a query vector into the K subspaces and, for each search item, calculating, for each subspace, an inner product between the query and the entry in the codebook assigned to the corresponding subspace of the search item and calculating a similarity score between the query and the search item by adding the inner product for each subspace. The operations may further include providing the search items with highest similarity scores. As another example, the operations may include permuting the elements of the search item prior to projecting the search items into subspaces. As another example, the operations may also include randomly rotating the elements of the search items prior to projecting the search items into subspaces.

As another example, generating a codebook for each subspace can include clustering the search item subspaces corresponding to the codebook, finding a cluster center for each cluster, the cluster center being the elements of the subspace of one of the search items, and storing, for each cluster, a codebook entry, the codebook entry being the cluster center. In some such implementations, the clustering uses Mahalanobis distance using a query covariance matrix generated from the example queries. In other such implementations, the clustering occurs using a task-dependent objective function trained to predict clusters using the example queries. Generating the codebook within constraints based on the example queries using the task-dependent objective function can include identifying a set of violated constraints for an example query, adjusting the codebook for each subspace entries that includes a violated constraint, and adjusting the cluster assignments. In some implementations, training occurs in iterations and each iteration identifies a maximum number of violated constraints.

According to one general aspect, a method includes generating a plurality of subspaces from search items in a database, the search items being represented as vectors of elements, a subspace being a block of elements from each search item that occur at the same vector position, generating a codebook for each subspace within soft constraints that are based on example queries, assigning each subspace of each search item an entry in the codebook for the subspace, the assignments for all subspaces of a search item representing a quantized search item, and storing the codebooks and the quantized search items.

These and other aspects can include one or more of the following features. For example, assigning each subspace of each search item an entry in the codebook can include generating a one-hot assignment vector for the search item. As another example, the method may also include projecting a query vector into the plurality of subspaces, calculating, for each search item in each subspace, an inner product between the query and the entry in the codebook assigned to the corresponding subspace of the search item, calculating, for each search item, a similarity score between the query and the search item by adding the inner product for each subspace, and providing the search items with highest similarity scores. As another example, the method may also include permuting the elements of the search item prior to projecting the search items into subspaces. As another example, the operations may also include randomly rotating the elements of the search items prior to projecting the search items into subspaces.

As another example, generating a codebook for a particular subspace can include clustering the search item subspaces that correspond to the particular subspace, finding a cluster center for each cluster, and storing, for each cluster, the cluster center as the codebook entry. Implementations may uses Mahalanobis distance using a non-centered query covariance matrix generated from the example queries for clustering, or the clustering may occur using optimization of a task-dependent objective function trained to use the example queries to provide soft constraints while minimizing expected quantization error. In some implementations using optimization of a task-dependent objective function, generating the codebook within constraints based on the example queries can include identifying a set of violated constraints for an example query, adjusting the codebook for each subspace entries that includes a violated constraint, and adjusting the cluster assignments. In some implementations, training occurs in iterations and each iteration identifies a maximum number of violated constraints.

According to one general aspect, a method includes generating a plurality of subspaces from search items in a database, the search items being represented as vectors of elements, a subspace being a block of elements from each search item that occur at the same vector position, generating a codebook for each subspace using optimization of a task-dependent objective function that minimizes quantization error within soft constraints established by example queries, and assigning each block of elements for each search item an entry in the codebook, generating a quantized search item. The method may also include projecting a query vector into the plurality of subspaces, using the quantized search item and the codebooks to perform an inner product search, and providing the search items with the highest similarity scores as responsive to the query.

These and other aspects can include one or more of the following features. For example, training of the task-dependent objective function occurs in iterations and each iteration identifies a maximum number of violated constraints. As another example, search items with the highest similarity scores are chosen search items and providing the search items with the highest similarity scores can include determining, for each chosen search item, an actual dot product score for the chosen search item and the query vector, ranking the chosen search items using the actual dot product score, and providing a sub-set of the chosen search items as responsive to the query.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer system comprising:
at least one processor; and
memory storing:
a database of search items, each of the search items being represented by a respective vector of d elements, and
instructions that, when executed by the at least one processor, cause the system to:
re-order the d vector elements of each search item using a random rotation,
project each re-ordered search item vector into K subspaces of i elements,
generate a codebook for each subspace, each entry in each codebook being a vector with i elements, the codebook being generated within constraints based on example queries,
assign each subspace of each search item an entry in the codebook for the subspace, the assignments for all subspaces of a search item representing a quantized search item, and
store the codebooks and the quantized search items in the memory.

2. The system of claim 1, wherein assigning each subspace of each search item an entry in the codebook includes generating an assignment vector with exactly one vector element being a 1 and remaining vector elements being 0, the 1 corresponding to an entry in the codebook.

3. The system of claim 1, wherein the memory further stores instructions that, when executed by the at least one processor, cause the system to:
re-order the elements of a query vector using the random rotation,
project the re-ordered elements of the query vector into the K subspaces;
for each search item:
calculate, for each subspace, an inner product between the query vector and the entry in the codebook assigned to the corresponding subspace of the search item, and
calculate a similarity score between the query and the search item by adding together the inner product for each subspace; and
provide at least the search item with the highest similarity score.

4. The system of claim 3, wherein the memory further stores instructions that, when executed by the at least one processor, cause the system to:
generate a table that stores, for each subspace, an inner product between the query vector and each entry in the codebook assigned to the corresponding sub space,
wherein calculating the inner product between the query and a search item includes using the codebook assignment of each subspace to fetch the inner product from the table.

5. The system of claim 1, wherein generating a codebook for each subspace includes:
clustering the search item subspaces corresponding to the codebook;
finding a cluster center for each cluster, the cluster center being the elements of the subspace of one of the search items; and
storing, for each cluster, a codebook entry, the codebook entry being the cluster center.

6. The system of claim 5, wherein the clustering uses Mahalanobis distance using a query covariance matrix generated from the example queries.

7. The system of claim 5, wherein the clustering occurs using a task-dependent objective function trained to predict clusters using the example queries.

8. The system of claim 7, wherein generating the codebook within constraints based on the example queries includes:
identifying a set of violated constraints for an example query;
adjusting the codebook for each subspace entries that includes a violated constraint; and
adjusting the cluster assignments.

9. The system of claim 8, wherein training occurs in iterations and each iteration identifies a maximum number of violated constraints.

10. A method comprising:
for each respective search item of search items in a database, each search item being represented as a vector of elements, re-ordering the elements of the vector using a random permutation,
generating a plurality of subspaces from the search items, a subspace being a block of elements from each search item that occur at the same vector positions;
generating a codebook for each subspace within soft constraints that are based on example queries;
assigning each subspace of each search item an entry in the codebook for the subspace, the assignments for all subspaces of a search item representing a quantized search item; and
storing the codebooks and the quantized search items.

11. The method of claim 10, wherein assigning each subspace of each search item an entry in the codebook includes generating a one-hot assignment vector for the search item.

12. The method of claim 10, further comprising:
re-ordering the elements of a query vector using the random permutation,
projecting the re-ordered elements of the query vector into the plurality of subspaces;
for each search item:
calculating, for each subspace, an inner product between the query vector and the entry in the codebook assigned to the corresponding subspace of the search item, and calculating a similarity score between the query and the search item by adding together the inner product for each subspace; and providing at least the search item with the highest similarity score.

13. The method of claim 12, further comprising:

generating a table that stores, for each subspace, an inner product between the query vector and each entry in the codebook assigned to the corresponding sub space, wherein calculating the inner product between the query and a search item includes using the codebook assignment of each subspace of the search item to fetch the inner product from the table.

14. The method of claim 10, wherein generating a codebook for a particular subspace includes:

clustering the search item subspaces that correspond to the particular subspace;

finding a cluster center for each cluster; and storing, for each cluster, the cluster center as the codebook entry.

15. The method of claim 14, wherein the clustering uses Mahalanobis distance using a non-centered query covariance matrix generated from the example queries.

16. The method of claim 14, wherein the clustering occurs using optimization of a task-dependent objective function trained to use the example queries to provide soft constraints while minimizing expected quantization error.

17. The method of claim 16, wherein generating the codebook within constraints based on the example queries includes:

identifying a set of violated constraints for an example query;

adjusting the codebook for each subspace entries that includes a violated constraint; and adjusting the cluster assignments.

18. A method comprising:

generating a plurality of subspaces from search items in a database, the search items being represented as vectors of elements, a subspace being a block of elements from each search item that occurs at the same vector positions;

learning a codebook for each subspace by optimizing a task-dependent objective function that minimizes quantization error within soft constraints established by example queries, wherein the example queries are used to identify violated constraints and adjust the codebooks over iterative rounds, the learning resulting in assignment of each block of elements for each search item to an entry in the codebook, generating a quantized search item;

projecting a query vector into the plurality of subspaces;

using the query vector, the quantized search items and the codebooks to perform an inner product search for search items responsive to the query; and providing at least the search item with the highest similarity score as responsive to the query.

19. The method of claim 18, further comprising:

generating a table that stores, for each subspace, an inner product between the query vector and each entry in the codebook assigned to the subspace, wherein using the quantized search item and the codebooks to perform an inner product search includes using the codebook assignment of each subspace of the quantized search item to fetch the inner product from the table.

20. The method of claim 18, wherein at least three search items with the highest similarity scores are chosen search items and providing at least the search item with the highest similarity score includes:

determining, for each chosen search item, an actual dot product score for the chosen search item and the query vector;

ranking the chosen search items using the actual dot product score; and providing at least the highest ranked chosen search item as responsive to the query.

* * * * *

UNITED STATES PATENT AND TRADEMARK OFFICE
CERTIFICATE OF CORRECTION

PATENT NO. : 10,255,323 B1
APPLICATION NO. : 14/878357
DATED : April 9, 2019
INVENTOR(S) : Guo et al.

Page 1 of 1

It is certified that error appears in the above-identified patent and that said Letters Patent is hereby corrected as shown below:

In the Claims

In Column 18, Claim 4, Line 6, delete "sub space," and insert --subspace,--, therefor.

In Column 19, Claim 13, Line 9, delete "sub space," and insert --subspace,--, therefor.

Signed and Sealed this
First Day of October, 2019

Andrei Iancu
*Director of the United States Patent and Trademark Office*